United States Patent [19]
Poole

[11] 3,898,547
[45] Aug. 5, 1975

[54] ELECTRIC VEHICLE CHARGER SHUT-OFF INTERLOCK SYSTEM

[75] Inventor: Charles W. Poole, Redlands, Calif.

[73] Assignee: Westinghouse Electric Corporation, Pittsburgh, Pa.

[22] Filed: Apr. 11, 1974

[21] Appl. No.: 460,251

[52] U.S. Cl. .................. 320/2; 307/94; 318/139; 320/5; 320/25; 320/54
[51] Int. Cl.² ................ H01M 10/46; H02J 7/02; H02H 11/00
[58] Field of Search ................ 320/2–9, 15, 320/25, 26, 27, 39, 54, 55, 57, 215; 318/139; 307/9, 10, 85, 86, 94, 150, 130, 137–138

[56] References Cited
UNITED STATES PATENTS

| | | | |
|---|---|---|---|
| 1,474,942 | 11/1923 | Probst | 318/139 X |
| 2,835,826 | 5/1958 | Vadas | 320/7 X |
| 3,317,810 | 5/1967 | Inoue | 320/56 |
| 3,387,194 | 6/1968 | Banks | 320/7 X |
| 3,414,796 | 12/1968 | Henquet | 320/54 X |

*Primary Examiner*—J. D. Miller
*Assistant Examiner*—Robert J. Hickey
*Attorney, Agent, or Firm*—H. G. Massung

[57] ABSTRACT

An electric vehicle battery charger interlock system is provided which prevents the vehicle from being driven while the batteries are being charged, and which prevents activation of the charger until the direct current connection of the battery charger to the electric vehicle is completed. This is accomplished by using standard, low-cost readily available solenoid relay switches and a three point connector and plug assembly. Two of the points of the connector and plug assembly provide direct current connection to the batteries of the electric vehicle. The third contact completes a series circuit through two relays one of which is located on the electric vehicle to prevent operation of the vehicle when activated, and the other relay which is connected to permit energization of the battery charger when activated. That is the electric vehicle is rendered inoperative when the vehicle batteries are being recharged. The charger cannot be turned on until the direct current cord is connected to the vehicle and the charger is automatically turned off when the charger cord is removed from the vehicle.

7 Claims, 2 Drawing Figures

PATENTED AUG 5 1975　　　　　　　　　　　　　　　　3,898,547

ELECTRIC VEHICLE CHARGER SHUT-OFF INTERLOCK SYSTEM

BACKGROUND OF THE INVENTION

This invention relates to electric vehicles and more particularly to a battery charger system used to recharge the batteries of the electric vehicle.

In most prior art electric vehicle battery charger designs the alternating current input side of the battery charger can be energized even though the direct current battery charger output is not connected to the electric vehicle batteries. That is, the AC input side of the battery charger can be activated even though the DC cord is not connected to the vehicle. Also with prior art battery chargers it is also possible to drive the vehicle while the batteries are being charged. With this construction it is possible for the vehicle to be diven off and the direct current charging cord can be jerked out of the vehicle receptacle and possibly damaged. The direct current power cord can also be hot when not connected to the receptacle on the electric vehicle and this presents the possible hazard of an electric shock. From a safety standpoint it is desirable to have an electric vehicle battery charger system which prevents the vehicle from being operated while the batteries are being charged and which prevents the charging connection, which can be accidentally contacted, from being electrically hot unless the charger is connected to the batteries of the electric vehicle.

SUMMARY OF THE INVENTION

The disclosed electric vehicle battery charger interlock system prevents the vehicle from being driven off while the batteries are being charged, and as an added safety feature the charger cannot be activated until connected to the batteries of the vehicle. The battery charger is automatically shut off when the output of the battery charger is disconnected from the batteries in the electric vehicle.

The disclosed invention comprises two relay means one of which is added to the electric vehicle speed control system and the other to the battery charger system. The plug and receptacle, for connecting the direct current output supply from the battery charger to the electric vehicle's batteries is of a three point type. Two of the points are provided for feeding charging current to the batteries of the electric vehicle, the third point when made completes a series circuit through the coils of the two relays, rendering the vehicle speed control system inoperative and permitting the battery charger to be energized.

The disclosed electric vehicle battery charger shut-off interlock system comprises a battery charger having an alternating current input and a direct current output, a relay disposed on the electric vehicle for preventing current flow to the direct current drive motor when activated, and means for activating the relay when the direct current output of the battery charger is connected to the batteries of the electric vehicle. Thus, when the battery charger is connected to the electric vehicle's batteries the direct current drive motor cannot be connected to the electric vehicle's batteries and the electric vehicle cannot be driven away. A second relay external to the electric vehicle is also provided for preventing the battery charger from being activated until the direct current output of the battery charger is connected to the batteries of the electric vehicle. When the output of the battery charger is connected to the electric batteries, the second relay is energized permitting the battery charger to be activated. If the output of the battery charger is disconnected from the batteries of the electric vehicle the battery charger is automatically deactivated and there is no danger of shock from the output cord of the battery charger. The coils of the first relay and the second relay are connected in a series circuit which is completed through a contact point on the plug receptacle combination used for connecting the output of the battery charger to the batteries of the electric vehicle. When the series circuit through the coils of the relays is completed the vehicle is rendered inoperative and the direct current output of the battery charger can be energized. This provides a safety feature in that the charging cord can no longer be jerked out of its socket by the operator driving off with the cord left in place. The AC side of the battery charger cannot be activated until the direct current cord is plugged into the vehicle. Thus the danger to personnel from a turned on or electrically hot battery charger output plug is eliminated.

It is an object of this invention to provide an electric vehicle battery charger interlock system which prevents the electric vehicle from being driven while the batteries are being charged.

It is another object of this invention to provide an electric vehicle battery charger shut-off interlock system which prevents the battery charger from being activated until the direct current output of the battery charger is connected to the batteries of the electric vehicle.

It is still another object of this invention to provide a battery charger which is automatically deactivated when the direct current output of the battery charger is disconnected from the batteries of the electric vehicle.

DESCRIPTION OF THE PREFERRED EMBODIMENT

Figure 1:
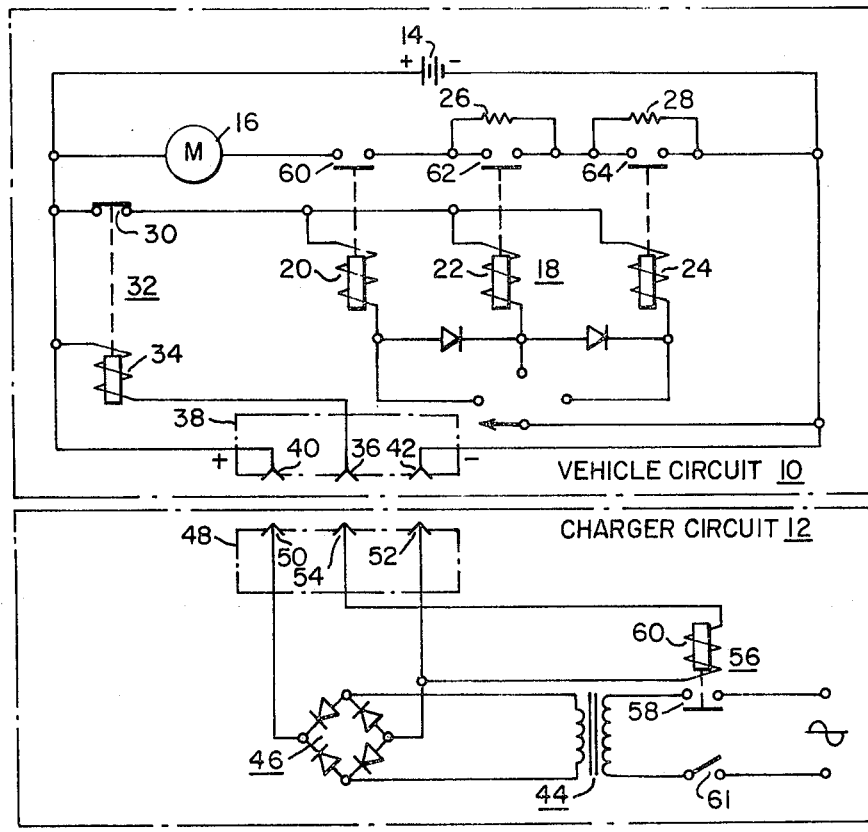
FIG. 1 is a schematic of an electric vehicle battery charger interlock system as taught by the present invention with the output of the battery charger disconnected from the batteries of an electric vehicle; and, FIG. 2 is a schematic similar to FIG. 1 but which the direct current output of the battery charger connected to the batteries of an electric vehicle.
Figure 2:
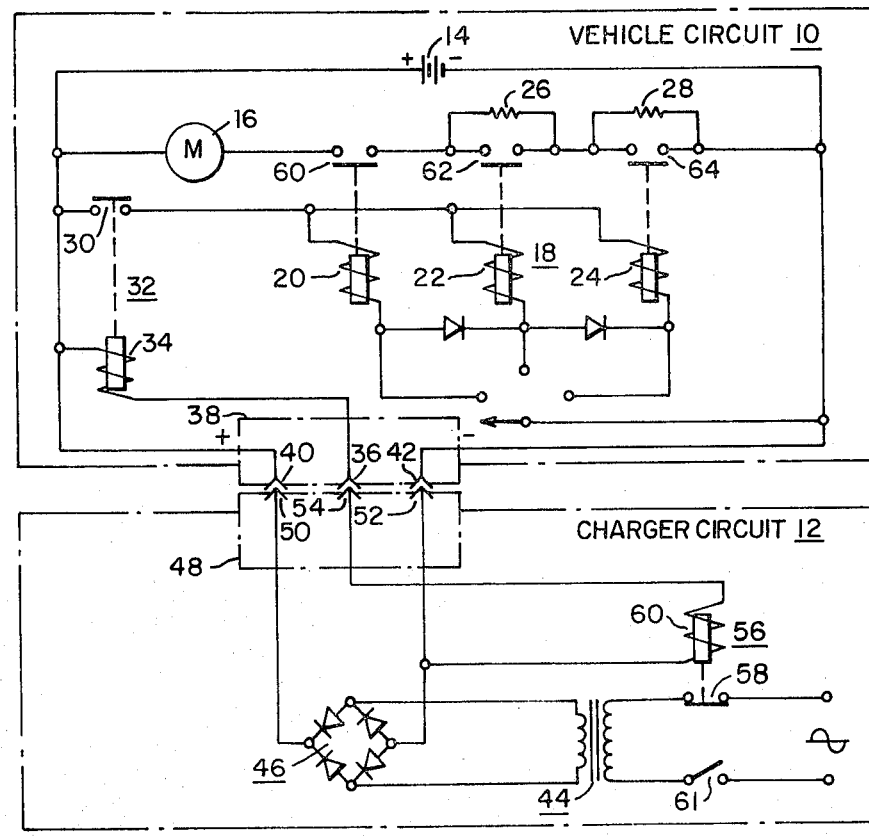

Referring now to the drawings there is shown an electric vehicle battery charger interlock system utilizing the teaching of the present invention. Electric vehicle circuit 10 is disposed on an electric vehicle (not shown) while the charging circuit 12 is provided external to the electrical vehicle. Electrical vehicle batteries 14 supply power to a direct current drive motor 16, which drives the electric vehicle at a speed in response to the speed solenoid control switch 18. As coils 20, 22 and 24 are activated they connect the direct current drive motor 16 to the batteries 14, and provide for increasing speed of drive motor 16 by shorting out resistors 26 and 28. A set of normally closed contacts 30 of relay 32 are connected in series with the coils 20, 22 and 24 which when energized close contacts 60, 62, 64 and control the current flow to drive motor 16. Thus, when normally closed contacts 30 are open the speed control circuit of electric vehicle is rendered inoperative and the electric vehicle cannot be driven. The normally closed solenoid relay coil switch 32 is connected with relay contact 30 connected in series with the vehicle speed control solenoids 20, 22 and 24 and the relay coil 34 connected at one end to the electric vehicle battery 14 positive terminal and at the other end to the center pin 36 of receptacle 38. The other two points 40 and 42 of receptacle 38 are connected to the positive terminal and the negative terminal of the batteries 14, respectively.

The battery charger 12 comprises a step down transformer 44, feeding rectifier 46, and an output connecting plug 48 connected across the direct current output of rectifier 46 at contact points 50 and 52. Plug 48 can be connected to receptacle 38 to complete a direct current output circuit through prongs 50 and 52 from the battery charger to the batteries 14. The battery charger circuit 12 is provided with a relay 56 having a set of normally open contacts 58 in series with the input from an alternating current supply. Coil 60 of relay 56 is connected at one end to the center prong 54 of plug 48 and at the other end connected to the negative side of the rectifier bridge 46. When plug 48 engages receptacle 38 a series circuit is completed through relays 32 and 56 energizing coils 34 and 60. When the connection is made current from the batteries 14 flows through coils 34 and 60 opening contacts 30 and closing contacts 58. Activating relay 32 disconnects the vehicle speed control solenoid circuit 18 from the battery 14 and therefore makes the vehicle inoperative. The activation of relay 56 closes contacts 58 and makes it possible to energize the battery charger 12 by closing switch 61. Thus the electric vehicle is rendered inoperative when the plug 48 engages receptacle 38 and the batteries are being recharged. Charger 12 cannot be turned on until the DC output cord of battery charger 12 is connected to the receptacle 38 of the electric vehicle. The battery charger 12 is automatically turned off when the charger cord is removed from the electric vehicle. When plug 48 is removed from receptacle 38 the battery charger 12 is automatically disconnected as contacts 58 open. Thus with the plug 48 disconnected from the receptacle 38 prongs 50, 52 and 54 present no hazard of electric shock.

It can be seen that the electric vehicle battery charger shut-off interlock system disclosed prevents the electric vehicle from being operated when the batteries are being recharged. The charger cannot be activated until the plug 48 is inserted in the receptacle 38 and the battery charger 12 is automatically turned off when the charger cord is removed from the vehicle. This provides significant safety advantages over the prior art.

I claim:

1. Means for charging the batteries of an electric vehicle driven by a direct current drive motor comprising:
   a battery charger having an alternating current input and a direct current output;
   first relay means disposed on the electric vehicle for preventing current flow to the direct current drive motor when activated;
   second relay means disposed in said battery charger for preventing charging current from flowing when not activated and for allowing charging current flow when activated;
   connecting means for connecting the output connections of said battery charger to the batteries of the electric vehicle; and,
   said connecting means comprises three electrical contacts, a first connection to the positive terminals of the battery, a second connection to the negative terminals of the battery and a third connection completing an electric circuit activating said first relay means and said second relay means.

2. Means for charging the battery of an electric vehicle as claimed in claim 1 wherein:
   said first relay means comprises a first coil which when energized activates said first relay means;
   said second relay means comprises said second coil which when energized activates said second relay means; and,
   said connecting means completes a series circuit through said first coil and said second coil when the direct current output of said battery charger is connected to the battery of the electric vehicle.

3. Means for charging the battery of an electric vehicle as claimed in claim 1 wherein:
   said connecting means comprises a plug and a receptacle for completing three or more electrical connections between said battery charger and electric vehicle a first connection to the positive battery terminal a second connection to the negative battery terminal and a third connection completing a series circuit through said first coil and said second coil.

4. Means for charging the batteries of an electric vehicle as claimed in claim 1 comprising:
   a speed control circuit for controlling the speed of an electric vehicle;
   said first relay means comprising a normally closed set of contacts disposed in series in said speed control circuit which when open prevents the electric vehicle from being operated;
   said second relay means comprising a normally open set of contacts disposed in series in the alternating current input of said battery charger to prevent charging current flow through said battery charger when open; and,
   said connecting means for connecting said battery charger to the batteries of the electric vehicle activates said first relay means and said second relay means causing the electric vehicle to be inoperative and permitting charging current to flow through said battery charger.

5. Means for charging the battery of an electric vehicle as claimed in claim 4 wherein said connecting means comprises a plug and receptacle which when engaged connects the direct current output of said battery charger to the batteries of the electric vehicle and completes an electric circuit which energizes said first relay means and said second relay means.

6. Means for charging the battery of an electric vehicle as claimed in claim 5 including a switch connected in series with the input to the battery charger which can turn said battery charger on or off after said second relay means is energized.

7. Means for charging the batteries of an electric vehicle as claimed in claim 5 wherein said connecting means comprises an electric circuit connecting the direct current output of said battery charger to the batteries of the electric vehicle and which when opened deenergize said first relay means and said second relay means.

* * * * *